US006973325B2

(12) United States Patent
Schaefer et al.

(10) Patent No.: US 6,973,325 B2
(45) Date of Patent: Dec. 6, 2005

(54) TEMPORARY BLOCK FLOW ALLOCATION METHOD

(75) Inventors: Bradley R. Schaefer, Chandler, AZ (US); John M. Harris, Chicago, IL (US); Mark L. Shaughnessy, Phoenix, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/671,213

(22) Filed: Sep. 24, 2003

(65) Prior Publication Data

US 2005/0064888 A1 Mar. 24, 2005

(51) Int. Cl.[7] .............................................. H04Q 7/00

(52) U.S. Cl. ...................................... 455/519; 455/455

(58) Field of Search ............................... 455/515, 516, 455/518–520, 509, 553.1

(56) References Cited

U.S. PATENT DOCUMENTS

| | | | | |
|---|---|---|---|---|
| 6,738,617 B2 * | 5/2004 | Rosen et al. | ................ | 455/418 |
| 2002/0058523 A1 * | 5/2002 | Maggenti et al. | ........... | 455/517 |

* cited by examiner

*Primary Examiner*—Nick Corsaro
(74) *Attorney, Agent, or Firm*—Frank J. Bogacz; Kevin D. Wills

(57) ABSTRACT

For a push-to-talk function in a mobile communication system (30), an indication is received (35) by a user (50) that the talking floor is available. Next, an uplink temporary block flow is established (36). Prior to release of the uplink temporary block flow by the mobile communication system, a refresh message is sent (39) to hold the uplink temporary block flow. Downlink temporary block flows may also be refreshed by this method, or by the mobile communication system. Then the requesting user may enable the push-to-talk function. These techniques can improve talker arbitration and call setup delays for push-to-talk.

25 Claims, 3 Drawing Sheets

TEMPORARY BLOCK FLOW ALLOCATION METHOD

BACKGROUND OF THE INVENTION

The present invention pertains to mobile communication systems and more particularly to improving response time for push-to-talk call services.

Temporary block flows (TBFs) are communication system resources (dynamically assigned virtual containers for packet data) which support uplink, data flowing from a mobile unit to the mobile communication system, and downlink, data flowing from the mobile communication system to the mobile unit. The resource allocation processes to allocate TBF's in, for example, a General Packet Radio Service (GPRS) system can be time consuming, taking hundreds of milliseconds to allocate the resource. Typically for currently deployed GPRS systems the temporary block flows are held for a relatively short time, a few hundred milliseconds or less, after packets cease to flow.

The system performance will improve when the newer GPRS systems use timers that will continue to hold the TBFs for a period of time after they are established (called super coat-tail timers) allowing for the TBF's to be retained in order to bridge jitter in the network, or between message transactions from the mobile unit to the network. However, these timers will still likely be set low relative to messaging events in push-to-talk applications, and will not provide needed performance benefits for these applications.

Another improvement will come with the infrastructure ability to automatically generate Downlink TBF's when Uplink TBF's occur. This will typically be done for internet browsing traffic, where the mobile unit sends a web URL request, and the downlink TBF is established expecting Web pages to be shortly delivered from the internet. This feature will also help the messaging delays for push-to-talk applications.

In GPRS systems the push-to-talk function and call establishment include a sequence of messages that are separated in time by more than a few hundred milliseconds. As a result, the push-to-talk function suffers time delays for packet channel reestablishment for each message or change of speaker. Typically, mobile users expect when speech has temporarily subsided that a press of the push-to-talk button and corresponding function will quickly entitle them to speak to the others engaged in the call. What is observed are: 1) excessive call setup times; and 2) lengthy waits for proceed tone when a would be speaker enables the push-to-talk function.

Accordingly, it would be highly desirable to have a method in use in a GPRS network to minimize the reestablishment of temporary block flows for call setup, speculative call setup and for speaker arbitration for the push-to-talk function.

PREFERRED EMBODIMENT OF THE INVENTION

Figure 1:
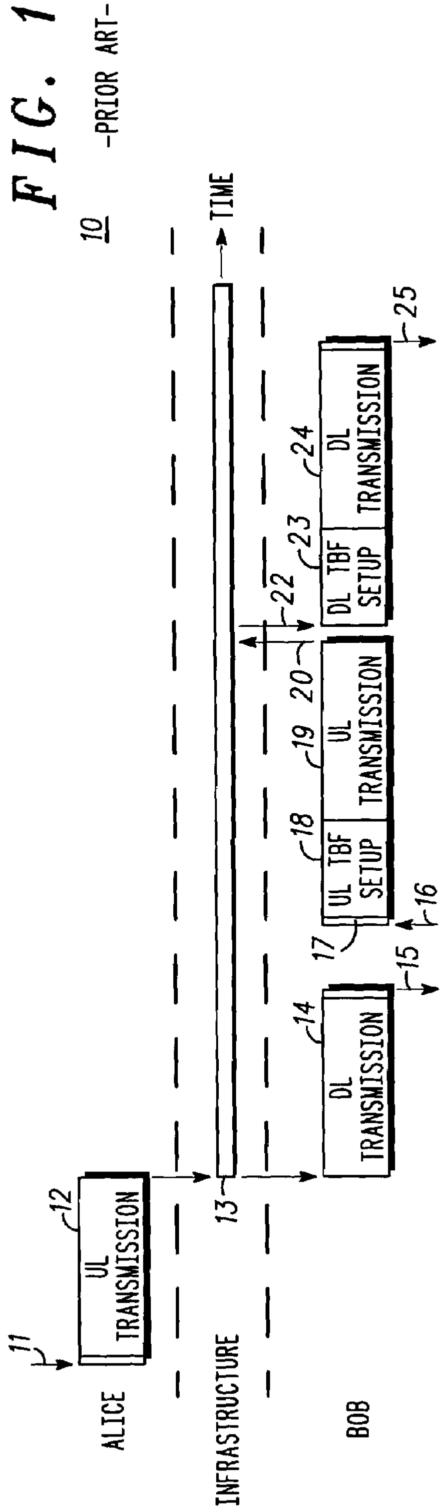
FIG. 1 is a block flow diagram of a prior art call setup and speaker arbitration in GPRS systems.

Referring to FIG. 1 a time flow diagram for talker arbitration in general packet radio service (GPRS) in the prior art is shown. Depicted are two parties, Alice and Bob, in a push-to-talk call arrangement in a GPRS system. Also shown are the actions of the GPRS system or infrastructure. FIG. 1 depicts the interactions of Alice, Bob and the system infrastructure 10.

Alice, using her handset (not shown), releases the push-to-talk button or function 11. As a result an uplink transmission 12 is sent from Alice's handset (not shown) to the system infrastructure. This uplink transmission 12 is a release message in which Alice is releasing her ability to speak in the conversation or is releasing the "floor". The push-to-talk function 13 of the system then processes this floor release message.

As a result the system infrastructure sends a downlink transmission message 14 to the other users on the call, in this case Bob, that the floor is open for the ability to speak. The floor open message 14 causes Bob's handset (not shown) to provide a audible cue or floor open chirp 13 to Bob. There will typically be some amount of "think time" for Bob from the floor open chirp 15 and extending to the time at which Bob presses the push-to-talk function 16 on his handset. When Bob presses the push-to-talk function or enables the push-to-talk function 16, Bob's handset and the system infrastructure must recognize this event and initiate processing 17. As a result Bob's handset and the system infrastructure establishes an uplink (UL) temporary block flow (TBF) setup 18 (messages between the mobile unit and the infrastructure is not shown for the uplink TBF setup). The uplink temporary block flow setup procedure 18 requires about ~600 milliseconds. Bob's handset then sends a floor request 20 message to the infrastructure, requiring an uplink transmission delay 19, which could take approximately ~100 milliseconds. The infrastructure then processes the floor request 20 and responds via link 22 with a floor grant message.

If the Downlink TBF was not already generated automatically in response to the Uplink TBF establishment, then the floor grant message 22 triggers the request for a Downlink (DL) temporary block flow (TBF) setup 23 by the infrastructure (messages between the mobile unit and the infrastructure is not shown for TBF establishment). This downlink TBF setup takes approximately ~300 milliseconds. Then the downlink transmission 24 of the floor grant is performed, which could take approximately ~100 milliseconds. At the end of this transmission an audible cue, a proceed-to-talk tone 25 is announced to Bob.

The time from Bob pressing the push-to-talk function 16 to the proceed-to-talk tone 25 could be as long as ~1500 milliseconds, including all the mobile unit and infrastructure processing times. The system hold time for uplink and downlink temporary block flows are relatively short, typically a few hundred milliseconds. Then in the prior art systems these temporary block flows must be reestablished requiring uplink and downlink TBF setups totaling 900 ms in this example. Since as was just shown the push-to-talk function includes a sequence of messages that are separated in time by more than a few hundred milliseconds, this causes a problem of adding substantial amounts of overhead time for uplink and downlink TBF setups for the critical push-to-talk function of the call setup phase.

Figure 2:
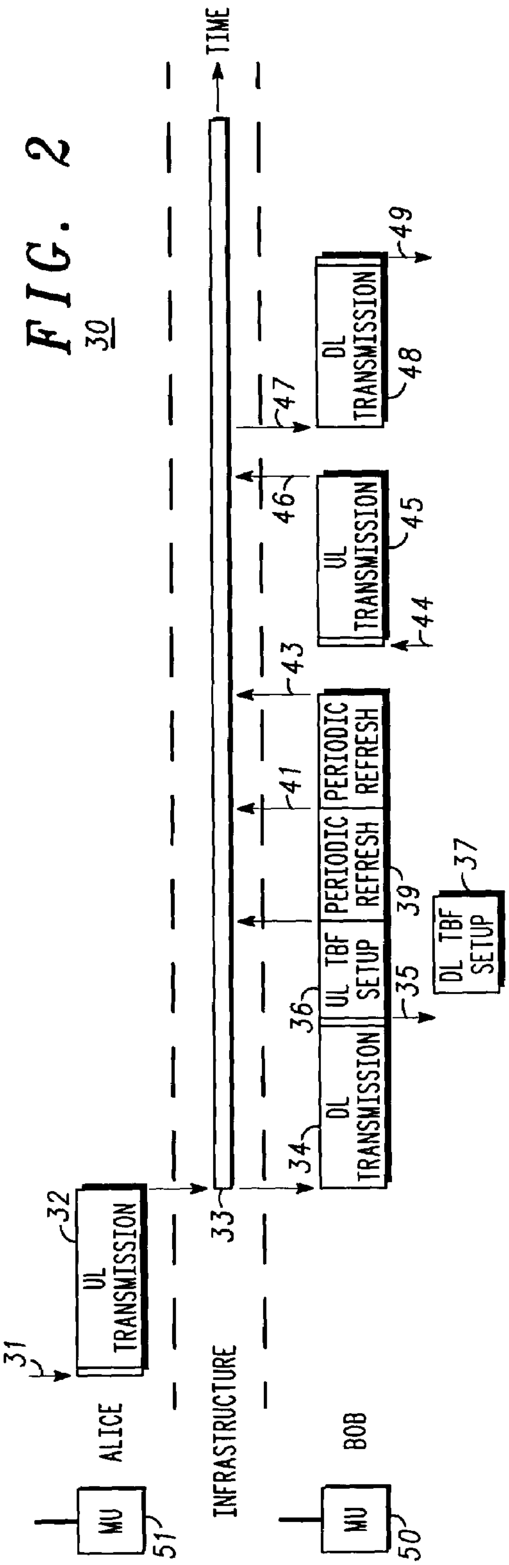
FIG. 2 is a block flow diagram of call setup and speaker arbitration in a GPRS system in accordance with the present invention.

FIG. 2 depicts a time flow diagram of a push-to-talk call functioning in a GPRS system architecture 30, in accordance with the present invention. Again, Alice and Bob are involved in a push-to-talk call via the GPRS system infrastructure. Alice releases the push-to-talk function 31 of her handset (mobile unit) 51. As a result an uplink transmission message 32 is generated which is a release-the-floor message. All system messages such as uplink transmissions and downlink transmissions are approximately ~100 milliseconds in time for this example.

The system infrastructure then processes 33 the floor release message. The system infrastructure then sends a floor open message by establishing a downlink transmission 34 to Bob's handset (mobile unit) 50, resulting in a floor open indication 35 (tone) to Bob.

The next procedure are the steps that "prime" the TBF's so they will be available for immediate use when Bob presses the button to request the floor. Even though Bob's handset 50 is not ready to request the floor, Bob's handset 50 performs an uplink TBF setup 36. The uplink TBF setup takes approximately ~600 milliseconds. Shortly after the uplink TBF setup 36 is established, the infrastructure automatically initiates a downlink TBF setup 37, assuming that the infrastructure supports this feature. Generally, this is done nearly simultaneously with the establishment of the uplink TBF. If it does not, then the downlink TBF establishment must be generated by the infrastructure periodically sending a refresh packet to maintain the downlink TBF.

At a point prior to the TBFs being released by the system, Bob's handset 50 responds with a periodic refresh function 39 which it sends to the infrastructure. This periodic refresh 39 keeps the infrastructure from releasing the uplink and downlink TBFs, assuming that the TBFs are maintained for a period of time (super coat tail timers) once they are established. For example, if the super coat tail timers are set at 500 ms, then Bob's handset will send refresh messages at periods less than 500 ms to the infrastructure to maintain the uplink and downlink TBF's. Thereby the release of the uplink TBFs is avoided and the time required to reestablish them is saved.

It is also possible that if super coat tail timers are not supported for uplink TBF's, that the same effect may be "virtually" achieved by having the handset continuously transmit refresh packets to in effect hold the uplink TBF by the mobile unit. This measure would only need to be taken on systems that would not support such hold timers.

In the case above, where the downlink is established/refreshed when the uplink is established/refreshed, only refresh messages are required from Bob's handset 50. However, in the case where the infrastructure does not automatically establish the downlink TBF when the uplink is established, the infrastructure can also provide a similar function. When the floor is open, the infrastructure can generate refresh messages that will refresh the downlink TBF's for each of the mobile unites.

Bob's handset then produces another periodic refresh message which is sent to the infrastructure. This message keeps the uplink and downlink TBFs from being released 41. This procedure is repeated 43 until Bob's requests the floor by invoking the push-to-talk function 44 (or until an exception timer occurs and ends the session). Bob's "thinking time" to request the floor occurs from the floor open notification 35 to the point where Bob requests the floor 44.

Bob's handset 50 generates an uplink transmission of this event 45 and transmits the floor request message via link 46 to the infrastructure. The system infrastructure then responds with a floor granted message via link 47. The downlink transmission 48 is received by Bob's handset 50 and as a result triggers an audio of a proceed-to-talk tone 49 for Bob. Bob's time to request the floor does not incur the delays associated with uplink and downlink TBF setup, as the TBF's are "primed" due to the refresh messages sent to the infrastructure, keeping the TBF's active.

Referring to the prior art FIG. 1, the approximate time between Bob pressing the push-to-talk function 16 and receiving the proceed-to-talk tone 25 was approximately ~1500 milliseconds. Referring again to FIG. 2, the time between Bob pressing the push-to-talk function 44 and hearing the proceed-to-talk tone 49 is approximately ~600 milliseconds or less. The 1.5 seconds of the prior art is a very noticeable by a user time to wait for a proceed-to-talk tone. The ~600 milliseconds using the present invention significantly improves the user experience for the push-to-talk function on a general packet radio service system. This invention greatly enhances dispatch services for push-to-talk function.

Figure 3:
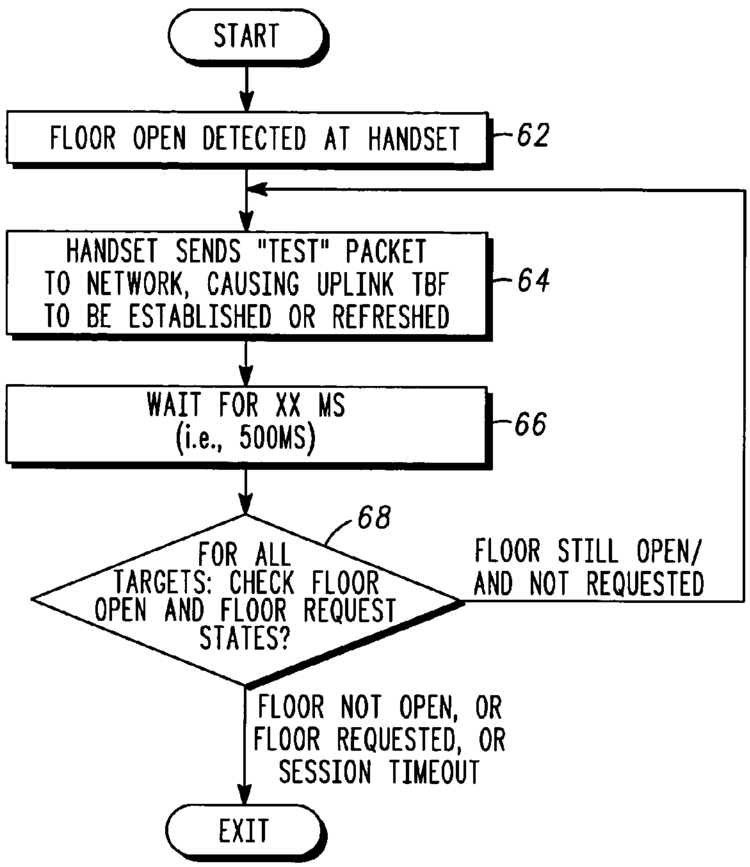
FIG. 3 is a flow chart of talker arbitration for GPRS systems in accordance with the present invention.

Referring to FIG. 3 a flow chart of the TBF control method for talker arbitration is shown. The method is started and block 62 is entered. The floor open message and audible chirp is detected at the handset of the non-talking users in a push-to-talk call, block 62. Next, the handset of the currently non-talking user sends a "refresh" packet to the network infrastructure which causes an uplink downlink TBF to be established or refreshed, block 64.

Next, the handset waits for a particular time interval, for example ~500 milliseconds, block 66. The waiting time is selected to be less than the expiry time for holding uplink TBF (this is also known as super coat tail timers). Then each of the target users checks the floor open and floor request states, block 68. If the floor is still open and not requested by another user, block 68 transfers control to block 64. Block 64 then sends a refresh packet from the particular user's handset to the network infrastructure which causes the uplink and downlink TBF to be refreshed.

As noted earlier, if the downlink TBF is not automatically established/refreshed when the uplink is established (due to capabilities of the infrastructure), then the infrastructure/server can generate similar type refresh messages to keep downlink TBF's active.

If the floor is not open or not requested or the particular push-to-talk session has timed out, block 68 simply transfers control to exit the process.

Figure 4:
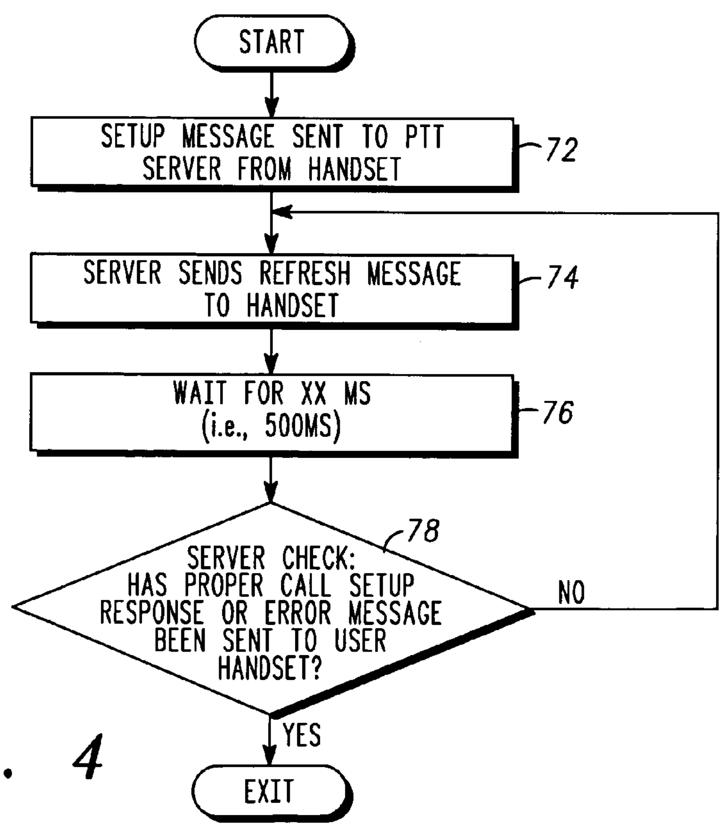
FIG. 4 is a flow chart of a call setup method for a GPRS system in accordance with the present invention.

FIG. 4 is a flow chart of a TBF holding mechanism applied to a call setup procedure for push-to-talk. The process is started and block 72 is entered. A call setup message is sent to the push-to-talk server from a user's handset, block 72. Next, the server or infrastructure sends a refresh messages to the handset which causes a downlink TBF to be established or refreshed, block 74.

The server infrastructure then waits a particular time less than the expiry time for downlink TBFs hold time (super coat tail timers), for example ~500 milliseconds, block 76. Then the server infrastructure checks whether the proper call setup response message or error response has been sent to the user, block 78. If the server has not sent any messages to the handset, block 78 transfers control to block 74. Block 74 sends a downlink TBF refresh message to hold the downlink TBF with the requesting user.

If the proper call setup response has been sent or an error message generated and sent, then the process is exited.

As shown in FIG. 3, the handset can also apply the uplink TBF technique to call setup, holding both the uplink and downlink TBF's by the handset generating a period refresh message to the infrastructure. This can be done instead of the flow shown in FIG. 4, which uses the infrastructure/server to generate the refreshes, keeping the downlink TBF's active.

Figure 5:
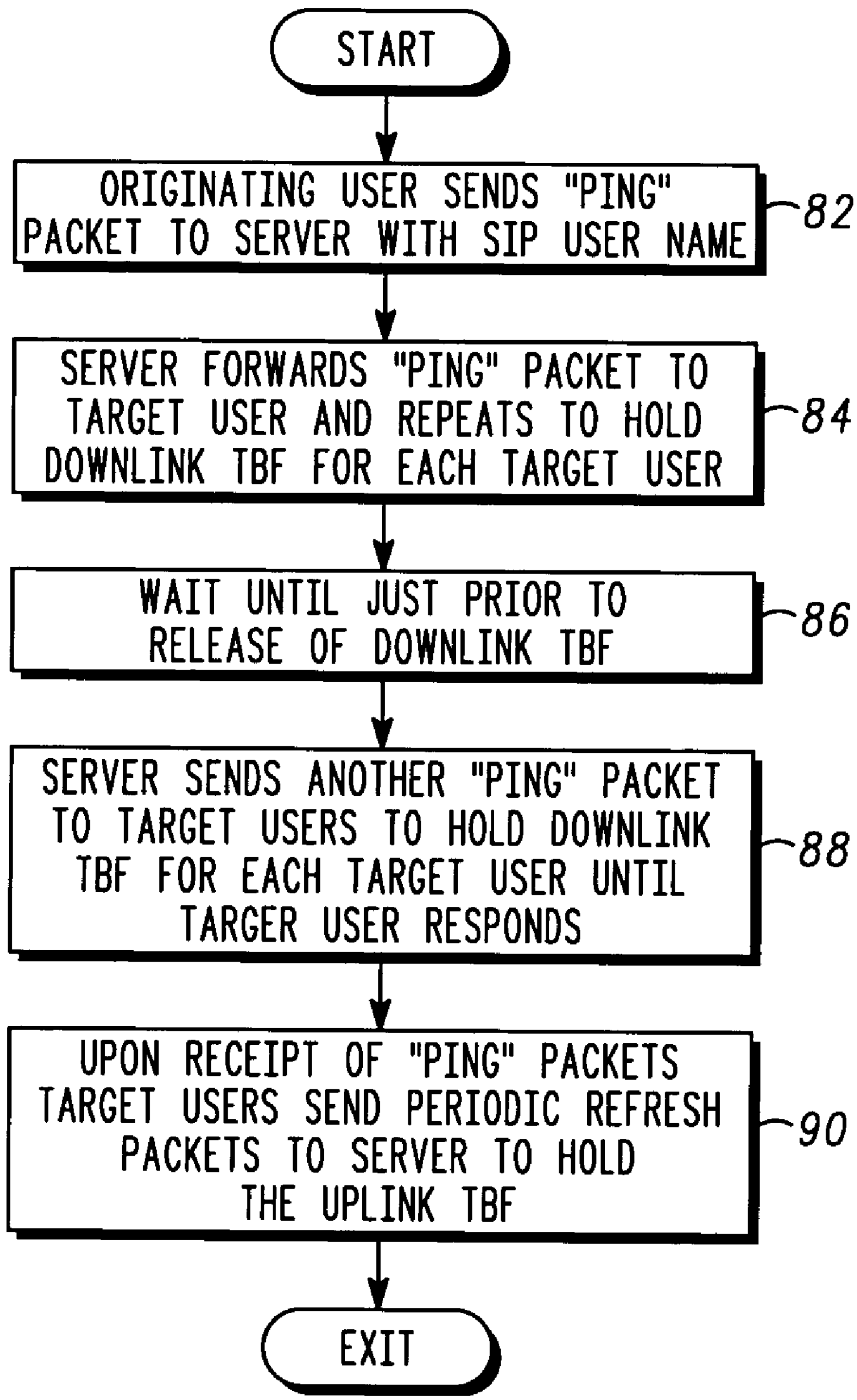
FIG. 5 is a flow chart depicting the principles of the present invention to a target speculation arrangement.

FIG. 5 is a flowchart depicting the principles of the present invention to a target speculation arrangement. That is, a target speculation arrangement is a process whereby prospective targets have links established through browsing or selection in the originating user's address book. The process is initiated and block 82 is entered. The originating mobile unit sends a "ping" or wake up packet to the server with the SIP user name of the potential target mobile unit or units. Next block 84 forwards by the server the "ping" packet to the target users and repeats the "ping" packet sending to hold the downlink TBFs for each of the units, in a method similar to that described in FIG. 4. Note, that the originating unit could send "ping" packets directly to the potential targets units, if the originating unit had stored or cached the IP addresses of these target units.

Next, the mobile communication system waits until just prior to release of the downlink TBF by the target mobile unit block 86. The communication system or server then sends a "ping" or wake up message to each of the target mobile units to hold the downlink TBFs, block 88.

Lastly, each potential target, upon receipt of the "ping" packet, sends periodic refresh packets to the server to hold the uplink TBF, block 90. The process is then ended.

Again, considerable call set up time is saved by waking up early in the call flow each of the target mobile units. Adding the ability to shorten the call setup process by removing the TBF setup delays will improve the call setup delays by nearly an additional 900 ms.

It is also envisioned that the the uplink refresh TBF methods discussed above could be invoked only when the handset can infer that the communication system is lightly loaded. There are things that the handset could determine about the network (good/bad RF conditions due to pilot strength, and estimates of interference/system load), and can be smart about only using the TBF refresh method when the system is lightly loaded, since this method tends to use more RF resources in exchange for high performance (lower delay).

Likewise, the downlink refresh TBF method could only be invoked by the infrastructure when it determines that the network is likely loaded, based on how many resources have been consumed in a sector. Therefore, this capability could be enabled/disabled dynamically by the infrastructure, trading performance for RF resources. Clearly the network and the handset could also use methods such as schedules (static, or based on history), to use the refresh TBF method only on off peak or non-busy hours. This would prevent running out of network resources at critical times.

Although the preferred embodiment of the invention has been illustrated, and that form described in detail, it will be readily apparent to those skilled in the art that various modifications may be made therein without departing from the spirit of the present invention or from the scope of the appended claims.

What is claimed is:

1. In a mobile communication system, a method for talker arbitration for a push-to-talk function, the method for talker arbitration comprising the steps of:

receiving an indication that a talking floor is available;

establishing an uplink temporary block flow;

prior to a release of the uplink temporary block flow by the mobile communication system, sending a refresh message to the mobile communication system to hold the uplink temporary block flow; and activating the push-to-talk function.

2. In a mobile communication system, the method for talker arbitration as claimed in claim 1 wherein there is further included a step of after establishing an uplink temporary block flow, establishing a downlink temporary block flow.

3. In a mobile communication system, the method for talker arbitration as claimed in claim 2 wherein there is further included a step of prior to a release of the downlink temporary block flow by the mobile communication system, sending a refresh message to hold the downlink temporary block flow.

4. In a mobile communication system, the method for talker arbitration as claimed in claim 3 wherein the steps of establishing a downlink and prior to release of the downlink sending a refresh message to hold the downlink are performed by a mobile unit.

5. In a mobile communication system, the method for talker arbitration as claimed in claim 3 wherein there is further included a step of, if a light traffic condition exists in the mobile communication system, sending a refresh message by the mobile communication system to a mobile unit.

6. In a mobile communication system, the method for talker arbitration as claimed in claim 3 wherein there is further included a step of, if a downlink temporary block flow is not established when the uplink temporary block flow is established, sending by the mobile communication system a refresh message to the mobile unit to hold the downlink temporary block flow.

7. In a mobile communication system, the method for talker arbitration as claimed in claim 1, wherein the steps of establishing an uplink, sending a refresh message, and activating the push-to-talk-to-talk function are performed by a mobile unit.

8. In a mobile communication system, the method for talker arbitration as claimed in claim 1 wherein there is further included a step of requesting by a mobile unit the talking floor.

9. In a mobile communication system, the method for talker arbitration as claimed in claim 6 wherein immediately responsive to the requesting the talking floor, the mobile communication system sends a message to the mobile unit granting the talking floor to the mobile unit.

10. In a mobile communication system, the method for talker arbitration as claimed in claim 1, wherein the steps of receiving, establishing, sending and activating are iterated for a plurality of mobile units.

11. In a mobile communication system, the method for talker arbitration as claimed in claim 1, wherein the mobile communication system includes a general packet radio service system.

12. In a mobile communication system, the method for talker arbitration as claimed in claim 1, wherein there is further included steps of:

determining whether a light traffic condition exists in the mobile communication system;

sending a refresh message, to the mobile communication system by a mobile unit, to hold the uplink temporary block flow, if the light traffic condition exists.

13. In a mobile communication system, the method for talker arbitration as claimed in claim 1, wherein there is further included steps of:

determining whether non-busy hour or off peak time conditions exist in the mobile communication system;

sending a refresh message, to the mobile communication system by a mobile unit, to hold the uplink temporary block flow, if the non-busy hour or off peak time conditions exist.

14. In a mobile communication system, the method for talker arbitration as claimed in claim 1, wherein, prior to the release of the uplink temporary block flow by the mobile communication system, the step of sending a refresh message includes a step of continuously sending the refresh message.

15. In a mobile communication system, a call setup method comprising the steps of:

sending a call setup initiation message to the mobile communication system;

establishing by the mobile communication system a downlink temporary block flow; and prior to a release of the downlink temporary block flow, sending a refresh message by the mobile communication system to hold the downlink temporary block flow.

16. In a mobile communication system, the call setup method as claimed in claim 15, wherein there is further included a step of determining by the mobile communications system whether a call setup response message was sent to a mobile unit.

17. In a mobile communication system, the call setup method as claimed in claim 16, wherein if no call setup response was sent there is further included a step of prior to the release of the downlink temporary block flow, sending a message to hold the downlink temporary block flow.

18. In a mobile communication system, the call setup method as claimed in claim 16, wherein if a call setup response message was sent to a mobile unit, the call setup method is ended.

19. In a mobile communication system, the call setup method as claimed in claim 15, wherein the step of sending the call setup initiation is performed by a mobile unit.

20. In a mobile communication system, the call setup method as claimed in claim 15, wherein the mobile communication system includes a general packet radio service system.

21. In a mobile communication system, a method for wake up of a target mobile unit comprising the steps of:

obtaining by the mobile communication system an identifier of the target mobile unit;

sending by the mobile communication system a wake up packet to the target mobile unit; and prior to a release of a downlink temporary block flow, sending by the mobile communication system a wake up message to hold the downlink temporary block flow.

22. In a mobile communication system, the method for wake up as claimed in claim 21, wherein there is further included a step of waiting by the mobile communication system until just prior to release of the downlink temporary block flow.

23. In a mobile communication system, the method for wake up as claimed in claim 21, wherein the step of obtaining includes the step of sending by an originating user a wakeup packet including the identifier of the target mobile unit to the mobile communication system.

24. In a mobile communication system, a method for wake up as claimed in claim 21, wherein there is further included a step of sending a wake up packet by an originating user directly to a target user device or client.

25. In a mobile communication system, a method for wake up as claimed in claim 21, wherein the mobile communication system includes a general packet radio service system.

* * * * *